US012305568B2

(12) United States Patent
Daya

(10) Patent No.: US 12,305,568 B2
(45) Date of Patent: May 20, 2025

(54) MECHANICAL LEVERAGE TO GENERATE TORQUE FORCE TO A ROTARY SHAFT

(71) Applicant: Arvind A Daya, Fayetteville, GA (US)

(72) Inventor: Arvind A Daya, Fayetteville, GA (US)

( * ) Notice: Subject to any disclaimer, the term of this patent is extended or adjusted under 35 U.S.C. 154(b) by 0 days.

(21) Appl. No.: 18/354,442

(22) Filed: Jul. 18, 2023

(65) Prior Publication Data

US 2025/0027441 A1 Jan. 23, 2025

(51) Int. Cl.
*F02B 75/32* (2006.01)
*F01B 9/04* (2006.01)
*F02B 75/40* (2006.01)

(52) U.S. Cl.
CPC .............. *F02B 75/32* (2013.01); *F02B 75/40* (2013.01); *F01B 9/042* (2013.01)

(58) Field of Classification Search
CPC ........... F02B 75/40; F02B 75/32; F01B 9/042
See application file for complete search history.

(56) References Cited

U.S. PATENT DOCUMENTS

| | | | | |
|---|---|---|---|---|
| 7,475,667 B2 * | 1/2009 | Al-Bannai | .............. | F02B 75/32 123/197.1 |
| 8,789,455 B2 * | 7/2014 | Galceran Sole | ........ | F01C 9/002 92/136 |
| 2008/0188340 A1 * | 8/2008 | Al-Bannai | .............. | F02B 75/32 475/162 |

* cited by examiner

*Primary Examiner* — Kevin A Lathers

(57) ABSTRACT

There is thus provided, in accordance with achieving a novel embodiment, as a rotary shaft turning force containment. This apparatus has a central component on the outer perimeter of a large circular gear assembly at a distance of its rotary shaft, plurality of individual cylinders such as internal combustion cylinders or steam cylinders are deployed angular acceleration uniformly fixedly attached on the circumference of the said embodiments frame to operate at a distance of said rotary shaft. The rotary shaft at the center of a large circular gear assembly whereby turned by smaller gears by means of linkage therethrough the said cylinders piston rod assembly. The idea behind the cylinders deployed at a distance of the rotary shaft is to take advantage of the mechanical leverage to generate maximum torque force with minimum effort. A microprocessor and associated memory are vital means of controlling rpm in communication with the embodiments.

4 Claims, 4 Drawing Sheets

MECHANICAL LEVERAGE TO GENERATE TORQUE FORCE TO A ROTARY SHAFT

FIELD OF INVENTION

Figure 1:
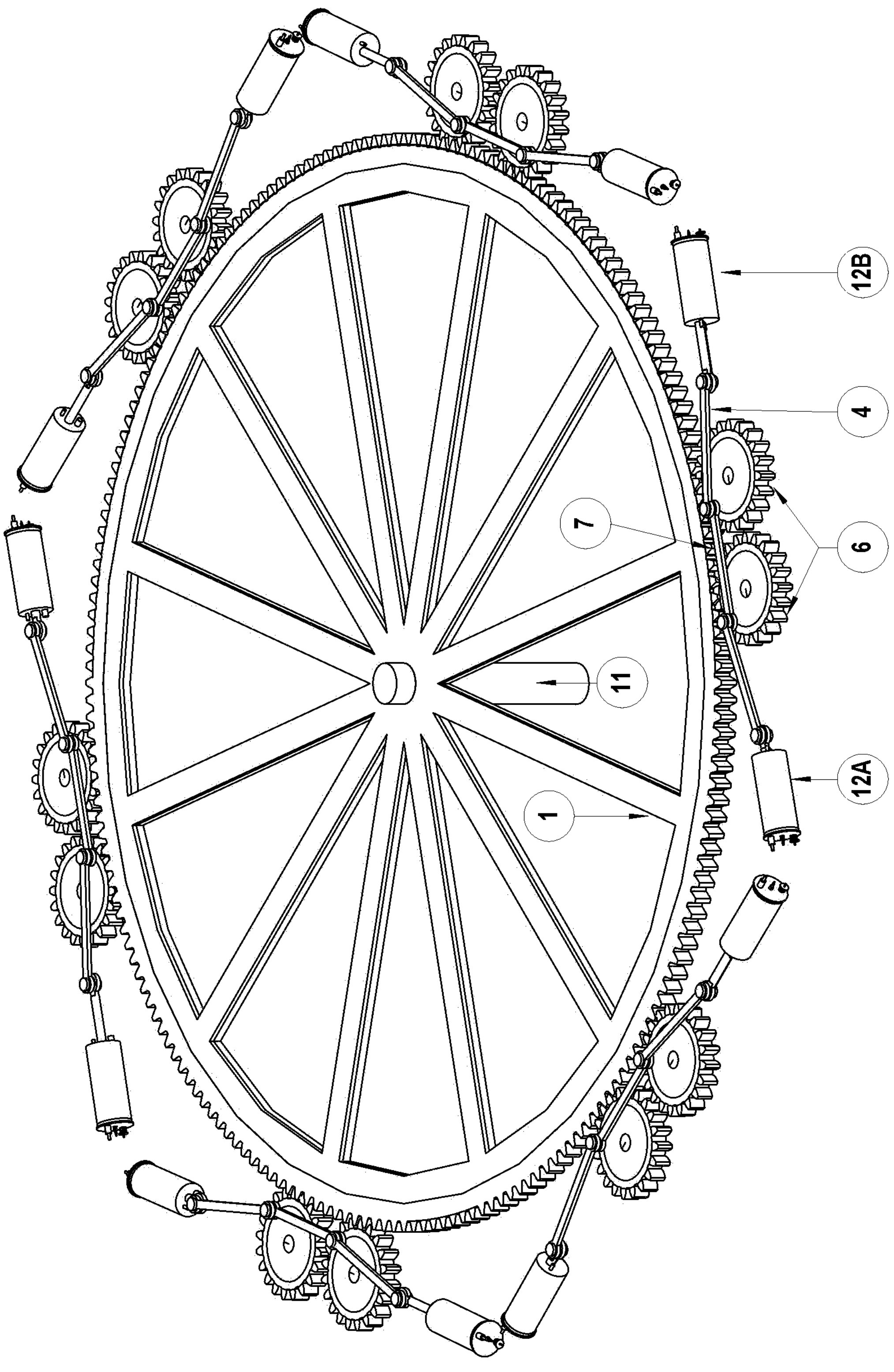

The field of invention relates to an embodiment and more particularly a low revolution per minute large circular gear assembly to deliver required turning torque to its rotary shaft.

BACKGROUND OF INVENTION

There is a general need for alternative sources of increasing torque on a rotary shaft which is inexpensive and efficient in operation. Additionally, there is a need for an embodiment which requires little maintenance and is low pollution or pollution free with greater turning torque on a rotary shaft. There is an increase concern about climate change and its effects on our lives and communities around the globe.

SUMMARY OF THE INVENTION

An object of the present embodiment is to employ an internal combustion cylinders or steam cylinders or pneumatic air cylinder or hydraulic cylinders or small jet engines at a distance of a rotary shaft to turn the said rotary shaft of a large circular gear assembly. As each internal combustion cylinder and piston rod assembly is activated thus turning the smaller gears by means of linkage mechanism there upon turning the large circular gear assembly thus applying rotating torque force to its rotary shaft at the center of the said large circular gear assembly. Another object of the present invention is to provide a system for generating considerable turning torque by the said embodiment, where the torque is transferred to its rotary shaft. Another object of present invention is this device is highly efficient which requires little maintenance. Still another object of the present invention is this embodiment can be implemented at sea or land almost anywhere around the globe. Another object of the present invention is said embodiment can be operated continuously. A further objective of the present invention is to provide a system for generating electricity or pumping liquid with minimum pollution. In the said embodiment of a large circular gear assembly wherein pluralities of said internal combustion cylinders are fixedly attached uniformly on the circumference of the said embodiment large circular gear assembly, where the said plurality of cylinders is activated alternatively certain selected number of units are activated at any given time thereby plurality of said units to be activated simultaneously. In the said embodiment thus consequently causes rotation of said large circular gear assembly and its rotary shaft generating required torque respectively can be transferred to a gearbox to meet the required rpm and torque output to a generator end, furthermore to minimize and reduce the sound pollution on the said embodiment, can be achieved with exhaust silences.

A principal object of this novel embodiment is to provide a large circular gear assembly, which performs as an embodiment to deliver required turning torque and angular acceleration on a said large circular gear assembly's rotary shaft, for example. A 40 ft diameter said large circular gear assembly embodiment, with its rotary shaft at a 20 ft radius. A 4 inch piston with a cylinder fixedly attached to the circumference alongside the said embodiments frame, each said cylinder injected air pressure of 125 psi, produces about 1,740 lbs. of force on said cylinder piston rod, if an internal combustion cylinder injected with metered amount of oxidized fuel and activated with spark ignition, the force would be approximately 20,000 lbs. of force. As the 4 in pistons crown is pushed with enormous explosive force in the said internal combustion cylinder, thereby force is indirectly transferred to the said rotary shaft, with only two said internal combustion cylinders activated simultaneously in this example generating massive torque of approximately 800,000 ft-lb of torque at the rotary shaft.

SPECIFICATION

In said apparatus, with plurality of internal combustion cylinders disposed uniformly at the outer circumference sections of a large circular gear assembly. The internal combustion cylinders are evenly arranged as individual units, as each internal combustion cylinder opposes each other in pairs as units along with sets of smaller gears fixedly attached to a frame on bearings thereby turning large circular gear assembly in circular motion trough is its linked mechanisms. The linked mechanisms is interconnected to a said rigidly mounted internal combustion cylinder piston rod assembly, whereby joined together by movable pivoting joint links to the said smaller gears driven by the parallel link whereby the said larger circular wheel gear assembly rotates. The smaller gears operate simultaneously in a parallel plane. These link mechanisms convert input motion or force into the desired output motion or force, enabling the said apparatus to rotate its said rotary shaft with remarkable efficiency and precision. A plurality of bearings on a frame to continuously support large circular gear assembly and its rotary shaft of the rotating load so as to hold the rotary shaft at a substantially fixed axis of rotation, on the said frame. The said frame is mounted on vibration absorbing mounts is a method to hold the frame from vibration by the said internal combustion cylinders trust forces. The said embodiments frame is locked in position permanently whereby counteracted by design, where the large circular gear assembly revolves on plurality of bearings supported by the said frame. A microprocessor and associated memory a vital means of controlling rpm in communication with the embodiments, a sensors, a solenoids, a pneumatic devices and valves to control the flow of compressed air, inject oxidized liquid or gas fuel mixture, and control spark ignition timing, whereby maintaining required torque and rpm on rotary shaft of the larger wheel gear assembly.

To maintain the specified speed of the embodiment is achieved by smaller gears with counter weights and rigid bodies to balance the said smaller gears thus turning the larger circular wheel gear assembly, smaller gears with rigid bodies are linked and interconnected mechanisms, often referred to as links, all of the movement is performed in a parallel plane joined together by movable joints. These mechanisms convert input motion or force into the desired output motion or force, enabling embodiment's devices to perform complex tasks with remarkable efficiency and precision. Either one or a number of said smaller gears can be fixed to parallel links, the movement of said links in the system will determine the movement of the system and also the speed. When using a two-pin linkage all of the movement is performed in a parallel plane. This is because regardless of what link is fixed they all move in a determined fixed way which is relative to the pivot or fixed point of a cylinder piston rod link. Linkage mechanisms are incorporated into systems to produce rotating, oscillating or reciprocating motion from the rotation. Linkage mechanisms consist of a series of mechanical linkages that can change direction, alter force and make things move in a certain way. Linkage mechanisms give you the ability to take one kind of motion and turn it into another type. They can be used to make embodiment components change direction and also alter the force that things move. The amount of movement or force needed can all be worked out in the design stage of the linkage mechanism. In the said embodiment the said large circular gear assembly's rotation is achieved either one or a number of said smaller gears and both pivoting and parallel links along with plurality of cylinders at both ends of the said smaller gears as a unit are activated alternatively whereby plurality of units can to be implemented simultaneously at any given time to turn the said large circular gear assembly to achieve required turning torque to the common rotary shaft therethrough a gearbox to a generator end. The principle function of the linkage mechanism in said embodiment is similar to a steam locomotive engine wheels propelling mechanism.

The said internal combustion cylinder that are injected with compressed oxidized fuel mixture, example gasoline is activated with a spark from a spark plug thereupon combustion takes place or with diesel fuel a glow plug and inject while compressing intensely at low flash point by keeping the oxidized fuel mixture cool while delivering under high pressure to cylinder once fuel enters the said cylinder fuel temp reached ignition temperature the said oxidized fuel will ignite thereby combustion takes place. Upon activation of the said internal combustion cylinders peak pressure will produce heat that can be cooled in many ways, and the top of the piston crown functions as an internal combustion cylinder, the lower end of the piston can be used as air compressor piston whereby air is stored in an external tank. The immense force of each of a piston crown as selected to be activated thereby these forces are managed to balance the impact and minimize vibration on the stationary components of the said embodiment for maximum torque output to the rotary shaft. This embodiment can be operated on gasoline, diesel, kerosene, jet fuel, steam, natural gas, biogas, and synthetic methanol and is capable to function on methanol hydrogen blend and hydrogen. To achieve higher rpm on a large circular gear assembly jet propulsion system can be considered as one of the potential solutions by removing the said gears thereby directly fixedly attaching small jet engines on the circumference of the said large circular gear assembly with stationary trust force exhaust fin blades.

Further objects and advantages of this invention will be apparent from the following detailed description of novel preferred embodiments which are illustrated schematically in the accompanying drawings.

DETAILED DESCRIPTION OF THE PREFERRED EMBODIMENTS

The present invention will now be described more specifically with reference to the following embodiments. It is to be noted that the following descriptions of preferred embodiments of this invention are presented herein for the purpose of illustration and description only; it is not intended to be exhaustive or be limited to the precise form disclosed. Referring particularly to the drawings, there is shown in FIG. 1 the embodiment of internal combustion cylinder attached is the principle layout at outer circumference of large circular gear assembly 1 driven by smaller gears 6. The smaller gears 6 fixedly attached with bearing not shown and the said internal combustion cylinders 12A, 12B as a unit fixedly attached to a frame not shown thereby the large circular gear assembly 1 propelled by activating said internal combustion cylinders 12A, 12B alternatively thus rotating smaller gears 6 with pivoting links 4 parallel link 7 turning large circular gear assembly 1 and rotary shaft 11.

Figure 2:
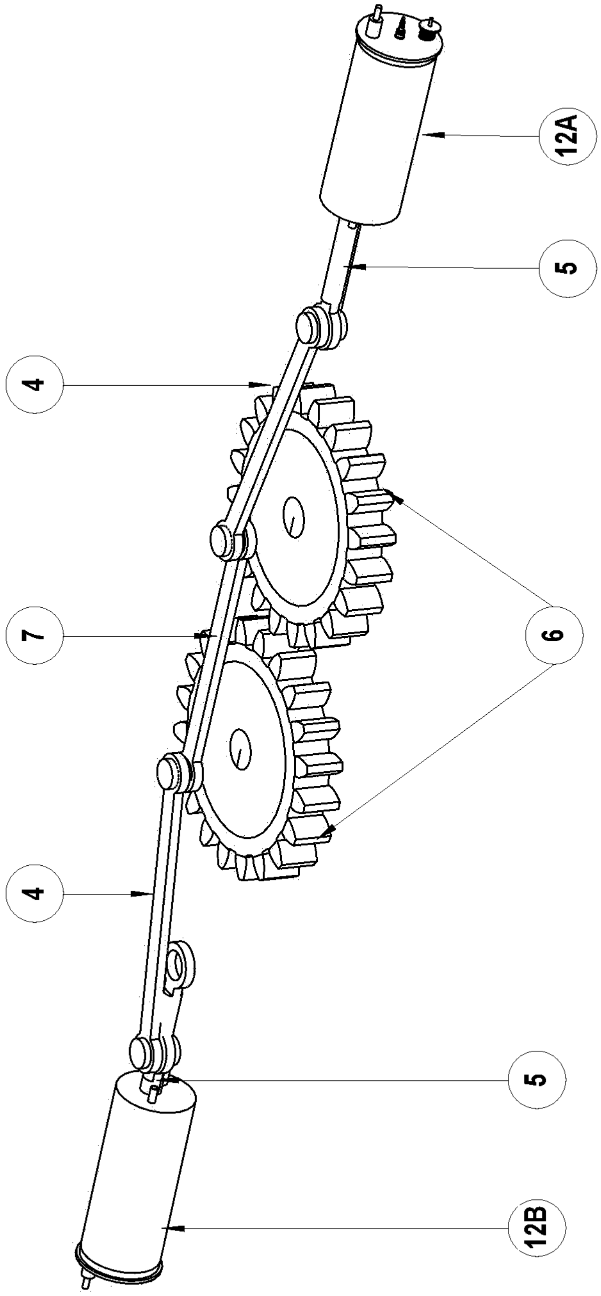

Referring now to FIG. 2 that functions as unit, the internal combustion cylinder 12A and 12B as pairs upon alternative activation whereby controlled and managed by a microprocessor therethough combustion forces are exerted by the piston rod 5 to the pivoting links 4 whereby propel small gears wheels 6, the gear wheels 6 are parallelly linked 7 functions uniformly, the small gears 6 rotates therethrough turns said large circular gear assembly 1 and thereby rotary shaft 11, as shown in FIG. 1. As the said internal combustion cylinders 12A and 12B alternate its activation thereupon the entire process as described above is repeated continuously. This entire operation is whereby managed by a microprocessor.

Figure 3:
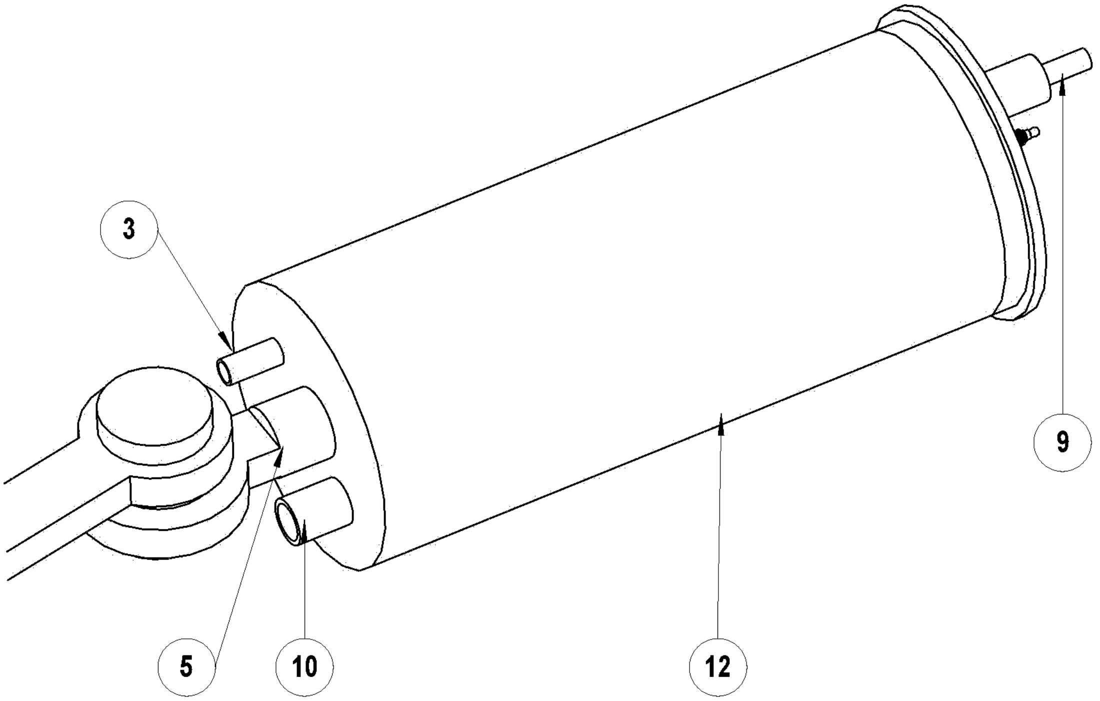
Figure 4:
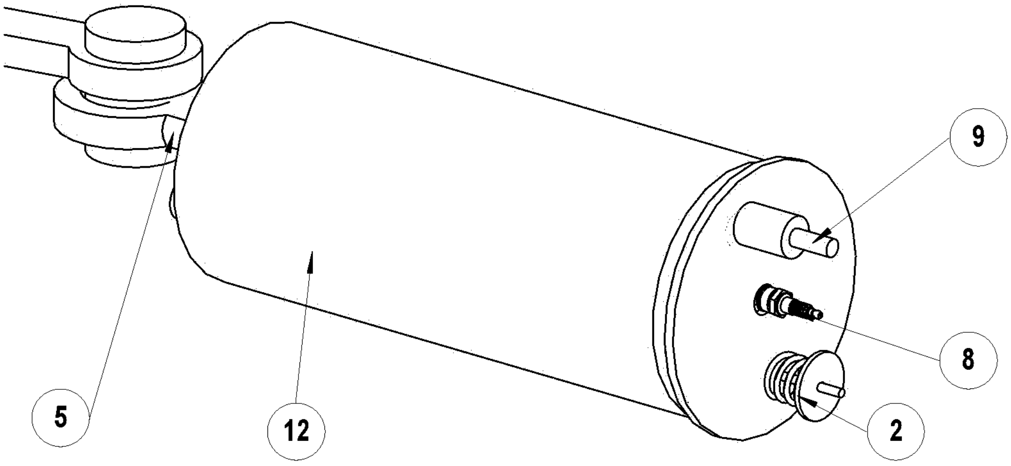

Referring now to FIG. 3 the internal combustion cylinder 12A as shown in FIG. 2 as the combustion takes place upon activation the piston and rod 5 exerted outward pressures from the bottom of the piston and rod 5 of the said internal combustion cylinder whereby a smaller pipe and check valve 3 compressed air is discharged to an external tank, furthermore the impact of the piston is cushioned. As the alternative 12B internal combustion cylinder is activated 12A piston and rod is pushed back creating suction whereby a larger pipe and valve 10 is opens, simultaneously exhaust valve 2 as shown in FIG. 4 opens letting out exhaust fumes. The internal parts of the cylinder are lubricated.

Referring now to FIG. 4 an internal combustion cylinder heads are capped at the top end of the piston with a compressed oxidized fuel mixture injection inlet 9, a spark ignition plug or a glow plug 8, and an exhaust valve 2 to expel combustion gasses. Method of reducing combustion noise silences attached. The internal combustion cylinder top view above the piston crown exhaust valve 2 is managed operation is controlled by a microprocessor, along with ignition spark plug, or glow plug 8 and a compressed oxidized fuel inlet port 9, whereby also managed by said microprocessor a vital means of controlling rpm in communication with the embodiments.

Figure 5:
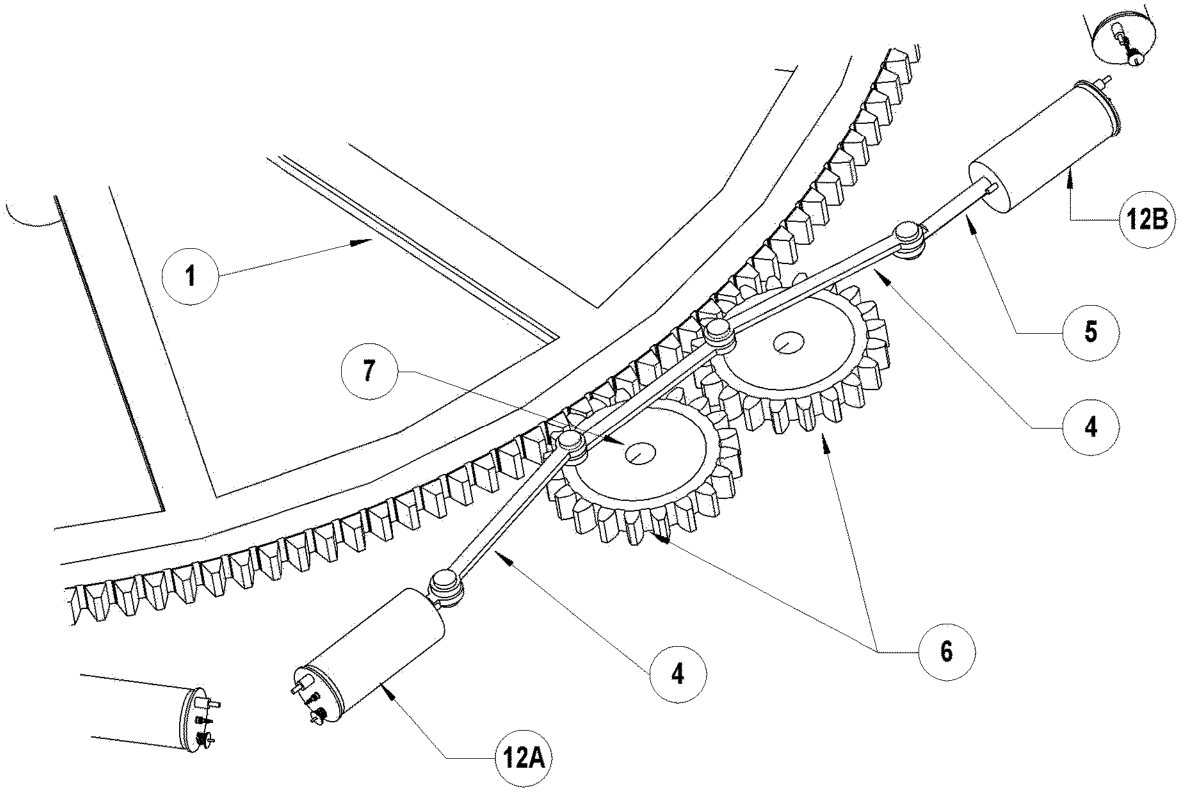

Referring now to FIG. 5 a large circular gear assembly 1 rotating on plurality of bearings on a frame not shown, a set of smaller gears 6 fixedly attached to said frame along with a set of internal combustion cylinders 12A, 12B all as a unit fixedly attached to a said frame where all three gears are in a parallel plane, the said internal combustion cylinders 12A, 12B opposing each other and been activated alternatively whereby combination of pivoting links 4 and 7 as a parallel link propelling as a unit turning smaller gears 6 therethrough the large circular gear assembly 1 whereby the rotary shaft 11 as shown in FIG. 1.

What I claimed is:

1. An internal combustion engine comprising: a circular apparatus capable of delivering rotating torque to a centrally located rotary shaft of a gearbox conveying mechanical advantage to rotate the rotary shaft of the gearbox, wherein the circular apparatus has a plurality of pistons which reciprocate within cylinders, the cylinders attached at a circumference of the circular apparatus, and wherein the piston are connected to pivoting links that transfer force to the circular apparatus conveying torque to the rotary shaft of the gearbox; and wherein the circular apparatus comprises a frame to stabilize and continuously support the circular apparatus, wherein the frame conveys rotational energy to the gearbox, and wherein the frame is on a fixed axis of rotation relative to the frame of the circular apparatus.

2. The engine of claim 1, wherein the circumference of said circular apparatus includes a smaller circular apparatus propelled by: a compressed oxidized fuel mixture injected and ignited in the cylinders; or a jet engine mounted on to the circular assembly.

3. The engine of claim 1, wherein the apparatus of the circular apparatus is rotated by attaching on the circumference of the apparatus at least one of a smaller circular apparatus conveying rotational energy and both a pivoting and parallel links along with an internal combustion cylinder piston rod link interconnected to operate as a unit attached to the frame to rotate the rotary shaft.

4. The engine of claim 1, wherein a microprocessor manages the operation of the circular apparatus, responsive to respective rotation angle and signals from sensors, wherein the engine includes solenoids, pneumatic devices, and valves are managed by the microprocessor.

* * * * *